United States Patent

Koike et al.

[11] Patent Number: 5,876,820
[45] Date of Patent: Mar. 2, 1999

[54] OPTICAL INFORMATION RECORDING MEDIUM AND COMPOSITION FOR OPTICAL INFORMATION RECORDING FILM

[75] Inventors: Tadashi Koike; Hideki Umehara, both of Yokohama; Yuji Inatomi, Kamakura; Takeshi Tsuda; Sumio Hirose, both of Yokohama, all of Japan

[73] Assignees: Mitsui Chemicals, Inc., Tokyo; Yamamoto Chemicals, Incorporated, Yao, both of Japan

[21] Appl. No.: 556,400

[22] Filed: Nov. 9, 1995

Related U.S. Application Data

[62] Division of Ser. No. 159,585, Dec. 1, 1993, Pat. No. 5,492,744.

[30] Foreign Application Priority Data

Dec. 2, 1992 [JP] Japan ................................. 4-323433
Apr. 28, 1993 [JP] Japan ................................. 5-102148

[51] Int. Cl.$^6$ ........................................... B32B 3/00
[52] U.S. Cl. .................. 428/64.1; 428/64.2; 428/64.4; 428/64.8; 428/913; 450/270.14; 450/273; 369/284; 369/288
[58] Field of Search ................... 428/64.1, 64.2, 428/64.4, 64.8, 913; 430/270.14, 273; 369/204, 288

[56] References Cited

U.S. PATENT DOCUMENTS 5,422,226  6/1995  Aihara et al. ........................... 430/273

FOREIGN PATENT DOCUMENTS 546474  of 1991  Russian Federation .............. 428/64.1

Primary Examiner—Elizabeth Evans
Attorney, Agent, or Firm—Oblon, Spivak, McClelland, Maier & Neustadt, P.C.

[57] ABSTRACT

An optical information recording medium is here disclosed which comprises a transparent substrate, a recording layer comprising an organic dyestuff on which information can be written by a laser beam, a reflective layer and a protective layer formed in this order on the substrate, the aforesaid optical information recording medium being characterized by containing a pit-edge control agent for the formation of recording pits, particularly a dyestuff thermal decomposition accelerator in the recording layer. By the addition of the pit-edge control agent, deviation properties and jitter properties can be remarkably improved, whereby a CD-R medium having a low error rate and good recording properties can be provided. In consequence, stable compatibility with a commercial CD player can be secured.

7 Claims, 2 Drawing Sheets

OPTICAL INFORMATION RECORDING MEDIUM AND COMPOSITION FOR OPTICAL INFORMATION RECORDING FILM

This is a division, of application Ser. No. 08/159,585 filed on Dec. 1, 1993, now Pat. No. 5,492,744, allowed Aug. 24, 1995.

BACKGROUND OF THE INVENTION (i) Field of the Invention

The present invention relates to an optical information recording medium, a composition for an optical information recording film, and a method for preparing the optical information recording medium. More specifically, it relates to a writing once optical information recording medium having compatibility with a compact disc, a composition for its recording film, and a method for preparing the recording film.

(ii) Description of the Prior Art

Some of optical information recording media using a laser beam have already been put to practical use as large capacity data memories.

In particular, compact discs (CDs) and CD-ROMs have been utilized as rapid access digital recording media having large capacity to memorize voices, images, code data and the like, and they have spread in markets. However, all of them are read only memories, and so in these media, anything cannot be recorded. Hence, a write-once optical recording medium is desired in which recording/editing can be optionally done by a user and which has compatibility with CDs and CD-ROM players largely spread in the markets.

Thus, there have been suggested and developed the optical recording media, i.e., CD-R media in which the recording can be carried out in accordance with compact disc (CD) standards [Nikkei Electronics, No. 465, p. 107, Jan. 23, 1989; and Optical Data Storage Technical Digest Series, Vol. 1, p. 45 (1989)]. The CD-R medium is formed by laminating a recording layer, a reflective layer and a protective layer in this order on a transparent resin substrate. When the recording layer is irradiated with a laser, a pit is formed in the recording layer, and the detection of a signal is carried out by a reflectance change at this site. This medium has a single plate structure having a thickness of 1.2 mm so as to satisfy CD standards, and the pits having 9 kinds of length at an interval of T in the range of from the shortest 3T pit length to the longest 11T pit length (T=231.4 ns) are used in accordance with a modulation method of a CD system, i.e., an EFM (eight to fourteen modulation) system. Therefore, in the CD-R medium, the pits corresponding to the 9 kinds of predetermined length are formed by the laser irradiation, and the pit length is reproduced by the detection of the thus formed pit edges.

In the recording system of the write-once optical information recording medium, particularly the CD-R medium, heat mode recording (thermal recording) which has undergone light/heat conversion is usually employed as a practical level. Therefore, as the composition for the recording film, there have been suggested low-melting metals, organic polymers and some organic dyestuffs which give rise to a physical change or a chemical change such as melting, vaporization, sublimation or decomposition. Above all, the organic dyestuffs which have a low thermal conductivity, a low melting point or a low decomposition temperature are preferable from the viewpoint of recording sensitivity. In addition, these organic dyestuffs are also preferable in point of optical design, because they can hold high reflectance for CD compatibility. In consequence, much attention has been mainly paid to cyanine dyestuffs, metal phthalocyanine dyestuffs, naphthoquinone dyestuffs and azo dyestuffs, and the recording layers have been developed from these dyestuffs.

Heretofore, some examples have been disclosed in which the CD-R media are constituted of the organic dyestuffs.

Hamada et al. have suggested and disclosed a CD-R medium in which the optical recording layer comprises a layer containing a cyanine dyestuff in Japanese Patent Application Laid-open No. 147286/1990. The medium system has high reflectance and good recording sensitivity.

However, the present inventors have found that this suggested invention has some problems. That is, since the recording layer comprises the cyanine dyestuff, error rate and jitter properties deteriorate noticeably under a high-temperature and high-humidity environment, and light resistance also declines, and so when data communication is often carried out with a CD, the reliability of the medium for a long time is poor. As more serious troubles, in EFM pit length recording, the formation stability of particularly the 3T pit edge is not always good, and problems of the jitter properties and the error rate take place at times.

Japanese Patent Application Laid-open No. 215466/1991 discloses a CD-R medium in which the optical recording layer comprises a phthalocyanine dyestuff having a specific substituent. The recording film comprising this dyestuff is excellent in light resistance, humidity resistance and heat resistance, so that the optical recording medium having good balance between reflectance and recording sensitivity can be provided. In this dyestuff system, however, we have elucidated the feature that in the EFM pit length recording, particularly the pit of a 3T pit length is formed more largely than in the prepits of the commercial CD and CD-ROM, and we have found that defective playback on the commercial or conventional CD player cannot be completely avoided owing to this feature of the pit edge.

On the other hand, with regard to the optical information recording media, some examples have been disclosed in which a certain kind of additive is added to the recording layer to improve the characteristics of this layer.

In Japanese Patent Application Laid-open No. 86787/1980, the improvement of recording sensitivity is intended, and a light absorber for a recording laser beam is added to the recording layer comprising an organic dyestuff or a resin to improve a light/heat conversion efficiency, whereby permitting the formation of the recording pits even by the laser irradiation of lower power. This light absorber itself does not have any influence on the recording threshold performances of the organic dyestuff or the resin having a recording function, for example, the thermal decomposition temperature of the organic dyestuff, and thus, substantially, the stability of the recording pits themselves formed by the heat mode recording is not always good. Additionally, in optical information recording media such as the CD-R medium in which the retention of the high reflectance for the CD compatibility is required, the deterioration of the reflectance which is inevitably caused by the addition of the light absorbent is not preferable.

Furthermore, Japanese Patent Application Laid-open Nos. 16888/1983, 62839/1983 and 92448/1984 disclose examples in which the recording sensitivity is mainly improved by adding an additive having self-oxidizing properties, for example, a nitro-based compound (such as nitrocellulose) to the organic dyestuff layer which is the recording layer. It has been confirmed that in this nitro-based system, the heat generated at the exothermic self-oxidizing decomposition of the additive functions as an effective heat source on recording, and the influence of the organic dyestuff itself having the recording function on the recording threshold properties and decomposition properties is observed sometimes. However, in this nitro-based system, the formation of the pits inevitably involves the rapid heat generation at the time of the oxidizing decomposition, and so the uniformity of the formed recording pit-edges is not always good. From experiments in which nitrocellulose is added, the present inventors have observed that particularly in the case that the pit length recording for the CD compatibility is carried out in the EFM system, the noticeable deterioration of signal qualities such as jitter properties is not avoidable.

In Japanese Patent Application Laid-open No. 23-9443/1986, Nanba et al. disclose the improvement of the light resistance of an optical recording layer by the use of the mixture system of an indolenine cyanine dyestuff and a dithiole transition metal complex, and additionally, in Japanese Patent Application Laid-open No. 25493/1992, they also describe the application of a mixture film comprising a cyanine dyestuff and the above-mentioned dithiole transition metal complex in a CD-R medium. In this system, the durability, particularly the light deterioration of the recording layer which is considered as a problem can be improved to some extent without impairing the recording properties of the cyanine dyestuff. However, in this technique, it has been confirmed that the dithiole metal complex functions, for the improvement of the durability of the medium, as an effective quencher for singlet oxygen which is considered to be the main cause of the light deterioration of the cyanine dyestuff, but the effect and improvement of characteristics in the pit length recording and the pit-edge detection are neither recognized nor referred to.

Other examples have been present in which the characteristics of the optical information recording medium are improved by an intramolecular or an intermolecular function of the organic dyestuff and a certain metal compound, but most of them are mainly concerned with the improvement of the durability of the above-mentioned recording film or the matching of the recording film with a recording laser wavelength in an absorptive section. Therefore, the effect of the used organic dyestuff on the recording threshold properties and the like is neither expected nor referred to.

As stated above, in the optical information recording media which have been heretofore developed, the control of the pit-edge is not always sufficient, and for this reason, the application of the media to the pit length recording is particularly difficult. Specifically, in the CD-R medium which is one typical example of the conventional media, the compatibility with the CD of the read only memory is not always sufficient, and in the playback on the prevalent commercial CD player, the CD-R medium gives rise to a problem at times.

The present inventors have analyzed and investigated this problem, and as a result, they have found that jitter components increase owing to the poor control of the pit-edge formed at the time of the laser beam irradiation, and that particularly in the pit length recording, the recording pits/lands are formed, deviating from a predetermined pit length or a pit interval length (hereinafter referred to as "land length"). This means the deviation from the pit standard length, and so it will be referred to "deviation properties." Thus, it has been found that in the process of data playback from the recording pits, the read error of a signal length tends to occur, and property deterioration such as the increase of the error rate takes place. In addition, it has been also found that this deterioration behavior is very liable to occur at the time of the formation of the pit length/land length which is smaller than the diameter of the irradiated laser beam.

Here, selecting the CD-R medium as an example, the shortest 3T pit length (0.83–0.97 micron) and the shortest 3T land length are required to be stably formed, avoiding light interference and heat interference in the recording film, in accordance with the CD recording system (EFM system) by the irradiation of laser beam having an effective radius of about 1 micron (usually by the use of a semiconductor LD in a near infrared region). However, in the conventional recording film design, this pit-edge control is very difficult. Therefore, particularly the formed 3T pits are excessively larger or smaller than the 3T prepit length of the commercial CD (in which compatibility with the CD player is sufficiently secured), and the deviation properties are poor and the jitter value is also high, so that errors are often made. In the worst case, it has been found that the problem of the defective playback takes place on the CD player.

SUMMARY OF THE INVENTION

The present inventors have intensively conducted research to solve the above-mentioned problems, and as a result, they have found that the above-mentioned deviation properties and jitter properties can be remarkably improved by adding a kind of pit-edge control agent to an organic dyestuff which is used as a recording layer.

The present invention is directed to an optical information recording medium which comprises a transparent substrate, a recording layer comprising an organic dyestuff on which information can be written by a laser beam, a reflective layer and a protective layer formed in this order on the substrate, the aforesaid optical information recording medium containing a pit-edge control agent for the formation of recording pits in the recording layer, preferably containing a thermal decomposition accelerator for the dyestuff as the pit-edge control agent in the recording layer, further preferably containing a metallic compound as the thermal decomposition accelerator in the recording layer, further preferably containing a metallic compound having substantially no absorption at wavelength of a recording laser beam, and further preferably, the recording layer comprising the organic dyestuff is formed by a coating method using a solvent for the dyestuff, and the metallic compound having substantially no absorption at the wavelength of a recording laser beam is soluble in a solvent for the organic dyestuff.

Here, the present invention is directed to an optical information recording medium preferably containing a metallocene or its derivative as the above-mentioned metallic compound, preferably containing a β-diketonato metal complex represented by the following formula (1) as the metallic compound:

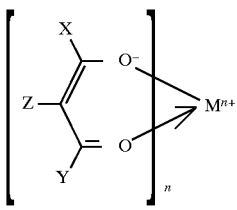

(1)

wherein each of the substituents X, Y and Z is independently a hydrogen atom, a halogen atom, $R^1$, $OR^2$, $SR^3$, $COOR^4$, $COONR^5R^6$, $SiR^7R^8R^9$ or $NR^{10}R^{11}$, and M is a metal having a valency of n (wherein $R^1$ is an unsubstituted or a substituted alkyl group, aryl group or unsaturated alkyl group, and each of $R^2$, $R^3$, $R^4$, $R^5$, $R^6$, $R^7$, $R^8$, $R^9$, $R^{10}$ or $R^{11}$ is a hydrogen atom, an unsubstituted or a substituted alkyl group, aryl group or unsaturated alkyl group), and preferably containing an anti-knocking agent as the metallic compound.

Furthermore, the present invention is directed to an optical information recording medium using a phthalocyanine compound as the organic dyestuff, and preferably using a halogenated phthalocyanine as the dyestuff.

Moreover, the present invention covers a composition for an optical information recording medium comprising an organic dyestuff and the above-mentioned pit-edge control agent, a composition for an optical information recording medium more preferably comprising a phthalocyanine compound as an organic dyestuff and the above-mentioned pit-edge control agent, and a composition for an optical information recording film more preferably comprising a halogenated phthalocyanine compound as an organic dyestuff and the above-mentioned pit-edge control agent.

In addition, the present invention also covers a method for preparing an optical information recording medium which comprises the steps of:

dissolving the above-mentioned composition in a solvent to form a solution, and coating thus obtained solution on a transparent substrate, thereby forming a recording layer comprising an organic dyestuff and the above-mentioned pit-edge control agent.

DETAILED DESCRIPTION OF THE PREFERRED EMBODIMENTS

Here, technical terms used in the present invention will be defined.

Figure 1:
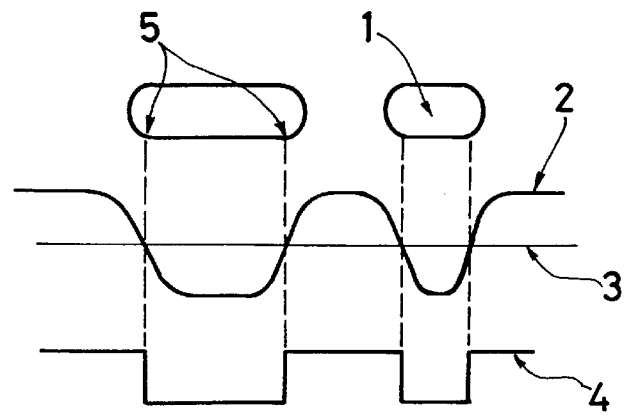
FIG. 1 is a conceptional view regarding the definition of a pit-edge.

Referring to FIG. 1, in the present invention, a recording pit 1 formed by laser irradiation is read out by an optical head installed on a CD player or the like as a signal (HF signal) (2) of a reflectance change shown. Binary-coded signal 4 is obtained via data slice circuit (which is represented by a slice level 3 in FIG. 1). A pit-edge 5 is defined as the position where an inversion of binary-coded signal takes place. This data slice circuit is described in detail in "Illustrated Compact Disc Book (second edition)" (written by Nakajima and Ogawa, and published by Ohm Co., Ltd.) and the like.

Figure 2:
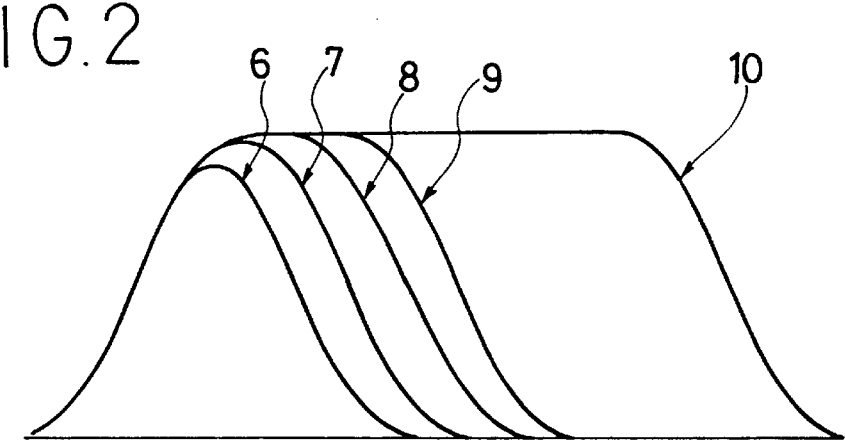
FIG. 2 is a recording laser irradiation profile.
Figure 3:
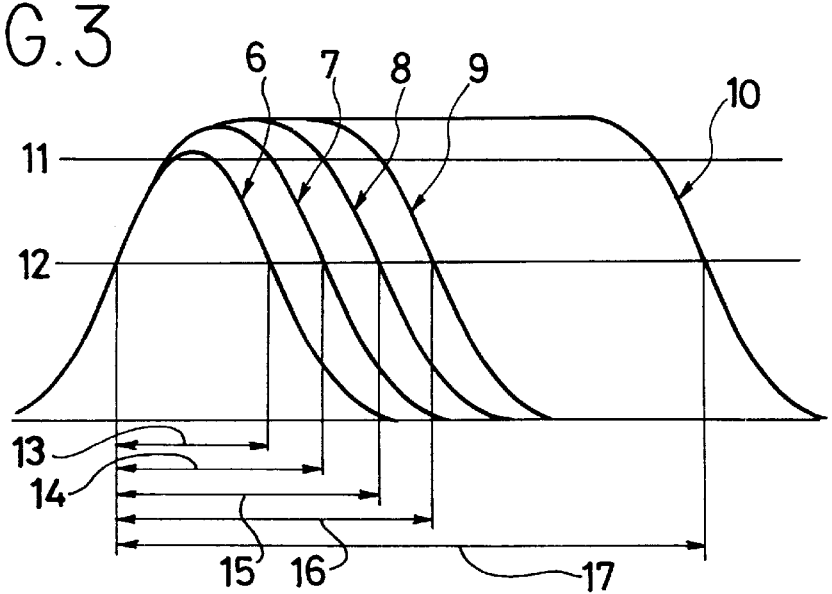
FIG. 3 is a conceptional view regarding the definition of a recording threshold level and a pit-edge.

A pit-edge control can be established if a distance between the pit-edges is given with a small deviation (jitter) and good linearity in the range of from the shortest pit length (or land length) to the longest pit length (or land length). This also means that the uniformity of the shape of the formed pit is apparently good and that the shape of the formed pit-edge is forwardly and backwardly symmetrical to the center of the pit and the pit-edge does not have strain and the like with sufficiently slight degree of deformation in a substrate, a recording layer and/or a reflective layer. In order to achieve high density, it is required to form a pit or pits having a pit edge length equal to or smaller than the spot diameter of the recording laser. In such a case, a good linearity is not given on the basis of a recording threshold level (a pit formation energy level) because in the shortest pit, the peak of the laser irradiation energy is not saturated yet, while the other longer pit/land is being saturated. FIG. 2 shows a laser irradiation profile to a laser input of nT by an EFM system (n=3, 4, 5, 6 or 11; calculated value). FIG. 3 shows the relation between a laser irradiation profile and the recording energy threshold level. Recording is made with the energy greater than this threshold level. Here, reference numerals 6, 7, 8, 9 and 10 in FIGS. 2 and 3 are the laser irradiation profiles of 3T, 4T, 5T, 6T and 11T, and reference numeral 11 is a recording threshold level. Here, it is considered that the formed pit length can be supposed from a point where this recording threshold level 11 intersects with the laser irradiation profile, and when the pit is formed in proportional to each laser input length, it can be defined that the linearity is good. As elucidated in the case of the threshold level 11 in FIG. 3, the present inventors have presumed that mainly in the formation of the shortest pit-edge which is smaller than the diameter of the beam, the jitter component is large, and so the control of the linearity is difficult. Thus, in order to form the pit-edge having the standard length and the good linearity, it has been considered that the recording threshold level of the recording film is rather required to be properly changed and regulated to secure the good linearity from the shortest pit. In the case of the threshold level 12 shown in FIG. 3, the formed pit length can be taken out at 3:4:5:6:11 as shown by reference numerals 13, 14, 15, 16 and 17 in correspondence with the laser input of 3T, 4T, 5T, 6T and 11T and consequently, the above-mentioned linearity is well established.

The pit-edge control agent which is referred to in the present invention can be defined as an additive which has an influence on the recording threshold level of the recording layer and makes change the same to achieve the stable formation of the shortest pit length, thereby permitting the good pit-edge control.

Figure 4:
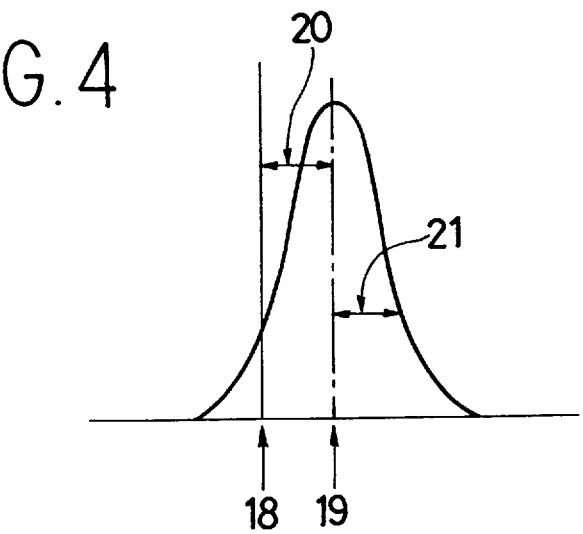
FIG. 4 is a conceptional view of a deviation ($\Delta$) and a jitter ($\sigma$).

This pit-edge controllability can be determined by directly observing the shape of the formed pit-edge by the use of an optical microscope, SEM, STM or the like. Alternatively, as a rather simple and practical procedure, the pit-edge controllability can be determined by playing back the formed recording pit line by the above-mentioned optical head, binary-coding by a data slice circuit, and then evaluating jitter properties and deviation properties by a time interval analyzer. In general, the detected frequency distribution of the signal pit length corresponding to a standard value $l_0$ (18 in FIG. 4) is as shown in FIG. 4. If the average value of a detected pit length (19 in FIG. 4) is l, the absolute value $\Delta$ $(=\{l_0-l\})$ (20 in FIG. 4) of a difference from the standard value $l_0$ is evaluated to be the deviation properties, and an unevenness $\sigma$ (standard deviation) of its distribution (21 in FIG. 4) is evaluated to be the jitter properties. In particular, the deviation and the jitter of the shortest pit length and the shortest land length in the applied modulation system are represented by appendages $_p$ and $_l$, respectively, and the following parameters $s_p$ and $s_l$ are introduced as the pit-edge controllability:

$s_p = \Delta_p + 2\ \sigma_p$ $s_l = \Delta_l + 2\ \sigma_l$

A certain kind of additive is called a pit-edge control agent which can decrease both $s_p$ and $s_l$.

Furthermore, in the thermal decomposition accelerator for a dyestuff as the pit-edge control agent of the present invention, thermal decomposition of dyestuff can be evaluated by the thermogravimetric analyst (TG analysis).

Figure 5:
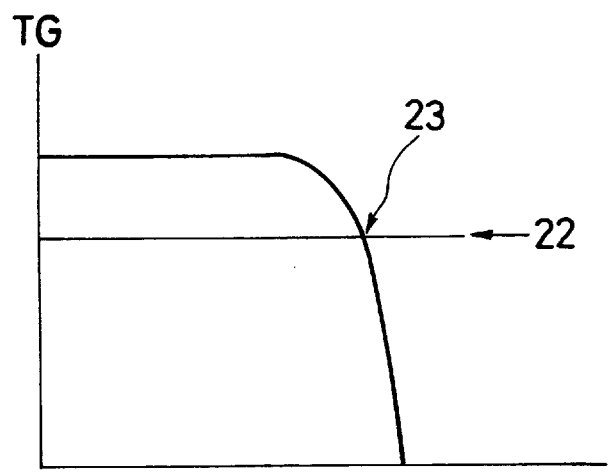
FIG. 5 is a heat reduction curve by a TG analysis.

Using, for example, a multipurpose thermal analytical device in which the balance mechanism of a horizontal type differential system is employed, a thermal reduction curve shown in FIG. 5 is obtained. In FIG. 5, a temperature of a point 22 at which the weight of the dyestuff is reduced to 80% of the initial weight of the dyestuff is defined as a thermal decomposition starting temperature 23.

Figure 6:
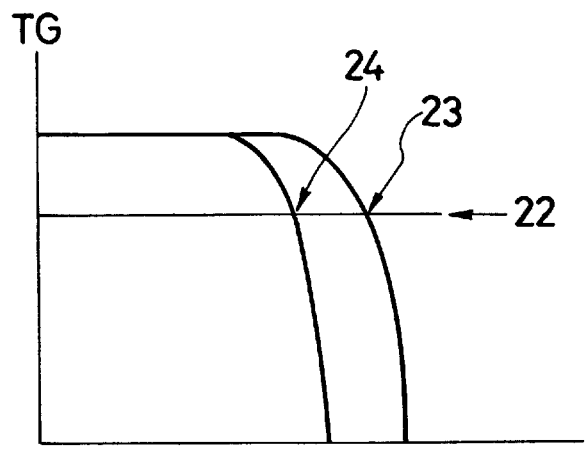
FIG. 6 is a conceptional view regarding the definition of a thermal decomposition accelerator.

Next, in the case that the thermal decomposition starting temperature of the dyestuff moves toward a lower temperature side (24 in FIG. 6) than the thermal decomposition starting temperature of the single dyestuff as shown in FIG. 6, this additive can be defined as the thermal decomposition accelerator for a dyestuff. Here, it is desirable that the thermal decomposition starting temperature moves toward the lower temperature side as much as 10° C. or more, preferably 25° C. or more.

Now, the constitution of an optical information recording medium of the present invention and a composition for an optical information recording layer will be described in detail.

As the material of the above-mentioned transparent substrate, any one can be used, so long as it is a material which can substantially transmit a laser beam for use in recording and which can be used in a usual optical recording medium. Examples of the transparent substrate include polymer materials such as a polycarbonate resin, an acrylic resin, a polystyrene resin, a vinyl chloride resin, an epoxy resin, a polyester resin and an amorphous polyolefin as well as inorganic materials such as glass. The substrate may have pregrooves or prepits, if necessary. The above-mentioned material can be molded by injection molding or a 2P method and then used as the substrate for the optical information recording medium. Furthermore, the laser beam incident side of the substrate may be coated with an inorganic thin film or a thin film comprising a dyestuff or a resin, if necessary, and this film also intends to prevent rubbish or dust from adhering thereto and to protect the substrate from a scratch.

No particular restriction is put on an optical recording layer, so long as it is an organic dyestuff having absorption mainly in the wavelength region of the laser beam for the recording and involving physical and chemical deformation, modification, decomposition, melting and foaming by the irradiation of the laser beam having a certain energy or more with optical/thermal conversion. For example, the following organic dyestuffs can be enumerated as the materials having an effective recording power.

That is, phthalocyanine dyestuffs, naphthalocyanine dyestuffs, cyanine dyestuffs, squarylium dyestuffs, pyrylium dyestuffs, thiopyrylium dyestuffs, azulenium dyestuffs, naphthoquinone dyestuffs, anthraquinone dyestuffs, indophenol dyestuffs, triphenylmethane dyestuffs, xanthene dyestuffs, indanthrene dyestuffs, indigo dyestuffs, thioindigo dyestuffs, merocyanine dyestuffs, acridine dyestuffs, oxazine dyestuffs and azo dyestuffs.

Above all, the phthalocyanine dyestuffs and the naphthalocyanine dyestuffs are very preferable, because their noticeable light resistance, humidity resistance and heat resistance have been confirmed and the design of an absorption band in the wavelength region of the recording laser is possible. Furthermore, as compared with other organic dyestuff systems, these dyestuffs are also desirable as the system in which the effect of the pit-edge controllability described herein, particularly the addition effect of the dyestuff thermal decomposition accelerator is effectively exerted. The particularly preferable phthalocyanine organic dyestuffs are compositions mentioned in U.S. Pat. No. 5,124,067, U.S. Pat. No. 5,220,010, U.S. Pat. No. 5,024,926, EP-4960538, EP-513370 and EP-519419.

In addition, more preferable examples of the dyestuffs include halogen-substituted phthalocyanine and naphthalocyanine dyestuffs, and halogen compound-containing phthalocyanine and naphthalocyanine dyestuffs, and it has been confirmed that the effect of the present invention is further effectively exerted by adding the pit-edge control agent mentioned herein, particularly the dyestuff thermal decomposition accelerator. Probably, it can be presumed that the effective function of the dyestuff thermal decomposition accelerator is easily exerted via the halogen introduced as a substituent or the halogen present in the recording film, but its definite mechanism is unknown.

As the halogenated phthalocyanine organic dyestuffs, compositions mentioned in U.S. Pat. No. 5,124,067, U.S. Pat. No. 5,220,010 and the like are particularly preferable. As the halogen atom for the substitution, bromine is particularly good. Moreover, the halogen compounds may be present in a mixed state in the recording film. No particular restriction is put on the halogen compound, so long as it has good solubility like the recording film and is excellent in workability and durability, but it is selected from halogenated alkyl compounds, halogenated aromatic compounds and halogenated olefin compounds. In particular, it has been confirmed that o-tetrahalogenated xylene and its derivatives are preferable, because they can effectively increase the function of the dyestuff decomposition accelerator and can exert the effect.

Of course, the organic dyestuffs mentioned above may be used singly or in the form of a mixture of two or more thereof. Furthermore, it is also possible to laminate two or more kinds of organic dyestuffs having different compositions.

On the other hand, no particular restriction is put on the pit-edge control agent to be added, so long as it, when added, has an influence on the recording threshold level of the recording film to reduce the pit-edge controllability s. In the case of the EFM system, in order to obtain the sufficient compatibility with the CD player in consideration of a data detection window width T/2 (=116 ns), it is preferable to satisfy $s_p = <70$ ns and $s_l = <70$ ns.

Additives which can effectively give the pit-edge control effect when added are substances capable of altering the physical properties of the recording layer on recording, and examples of these additives include the thermal decomposition accelerator for the dyestuff, an oxidation accelerator, a heat generation inhibitor, a melting point depressant, a surface active agent, a lubricant, a dispersant, a crosslinking agent, a foaming agent and an anti-foaming agent.

According to the detailed investigation by the present inventors, as an effective physical parameter (recording threshold) which should be noted to more successfully achieve the pit·edge control, the thermal decomposition temperature of the organic dyestuff layer is particularly raised. Especially, in order to effectively reduce the edge controllabilities, the additive to be added to the recording layer is required to be an additive capable of causing the heat decomposition of the organic dyestuff used in the recording layer on a lower side. Therefore, it is preferable that the pit·edge control agent of the present invention is the dyestuff heat decomposition accelerator. Needless to say, in this system, it has been confirmed by the observation of SEM or the like that the uniformity of the recording pit·edge shape is very good. Here, no particular restriction is put on the thermal decomposition accelerator for the dyestuff to be added, so long as the acceleration of the dyestuff thermal decomposition by the thermal decomposition accelerator for the dyestuff can be confirmed by the above-mentioned TG analysis. Nevertheless, its preferable example can move the dyestuff thermal decomposition starting temperature as much as 10° C. or more, preferably 25° C. or more on the lower temperature side. Furthermore, the dyestuff molecule to be used and the dyestuff decomposition accelerator molecule to be added may have a certain physical or chemical interaction when mixed, so long as they do not disturb the effect of the present invention. Of course, for the sake of this function, the dyestuff thermal decomposition accelerator composition at the time of the addition may take either state of solid or liquid.

Here, as the thermal decomposition accelerator for the dyestuff which is excellent in the deviation properties of the recording pit and which can particularly satisfy the low jitter properties from the good pit shape, preferable are a series of metallic compounds whose very excellent functional effect can be confirmed. This metallic compound means a substance constituting a compound in which an element defined as a metal element in the periodic table is contained in the form of an atom, an ion or a cluster. In particular, a preferable system in which the effect of the present invention can be effectively exerted is a morphology of an organic metal compound, i.e., a ligand comprising a certain kind of organic compound, or a compound having a bond to a metal atom or a metal ion in the state of a pair of ions. For example, selecting an iron metallic compound as an exemplary system for very effectively exerting the effect of the present invention, examples of the metallic compound which can be used in the present invention include fatty acid irons such as iron formate, iron oxalate, iron laurate, iron naphthenate, iron stearate and iron butyrate; chelate coordination iron complexes such as acetylacetonato iron complex, phenanthroline iron complex, bispyridine iron complex, ethylenediamine iron complex, iron ethylenediaminetetraacetate complex, diethylenetrimaine iron complex, diethylene glycol dimethyl ether iron complex, diphosphino iron complex and dimethyl glyoxymato iron complex; inorganic iron complexes such as cyano iron complex and ammine iron complex; iron carbonyl complex; and biscyclopentadienyl iron complex (ferrocene). In addition, the iron metallic compounds also include iron halides such as ferrous chloride, ferric chloride, ferrous bromide and ferric bromide; inorganic iron salts such as iron nitrate and iron sulfate; and iron oxides.

Furthermore, the thermal decomposition accelerator for the organic dyestuff used herein is preferably specified from the metallic compounds which do not have any absorption in the recording laser wavelength region to be used, and therefore it is also very large feature that the reflectance of the recording film does not deteriorate even when the thermal decomposition accelerator is mixed with the organic dyestuff. It can be here defined that the absorption is present when $\epsilon < 10$ $mol^{-1}cm^{-1}$ is satisfied in the noted wavelength region wherein $\epsilon$ is an optical molar extinction coefficient of the added substance.

Moreover, from the viewpoint of the process, the thermal decomposition accelerator which is used herein for the organic dyestuff and has no absorption in the laser wavelength region is preferably mixed with the organic dyestuff and simultaneously molded into a film, and therefore it is preferable that the thermal decomposition accelerator is soluble in a solvent which can dissolve the organic dyestuff therein at the time of the film formation and which is excellent in workability. Incidentally, this dissolution can be here defined as that there can be attained a solubility of 0.2 g/l or more, preferably 1 g/l or more in the solvent which is used to dissolve the organic dyestuff.

As the above-mentioned pit·edge control agent which is the metallic compound, shows the particularly good dyestuff thermal decomposition acceleration effect, has no absorption in the laser wavelength region, is excellent in the solubility in the film formation solvent for the organic dyestuff, and can effectively exert the effect of the present invention, there can be mentioned metallic compounds such as a series of metallocene compounds and their derivatives, a series of β-diketonato metal complexes and their derivatives, and metal-based anti-knock agents. In the system containing the added metal-based compound, the thermal decomposition starting temperature of the dyestuff can be dropped as much as about 25° C. or more, and the good pit·edge control has been confirmed. For example, at the time of the application of the EFM, the excessive extension or reduction of mainly 3T pit which has been difficult to control in a conventional CD-R medium is successfully inhibited, so that the deviation of the formed pits can be remarkably improved, and the jitter properties can also be improved.

Examples of the metallocene compound which permits the effective exertion of the effect of the present invention include Fe biscyclopentadienyl complex (ferrocene), biscyclopentadienyl metal complexes of Ti, V, Mn, Cr, Co, Ni, Mo, Ru, Rh, Zr, Lu, W, Os and Ir. It has been confirmed that above all, ferrocene, ruthenocene, osmocene, nickelocene, titanocene and their derivatives, which are thermally stable, of course at ordinary temperature, during the laser irradiation and even at a relatively high temperature, are very excellent in the pit·edge controllability at the time of the laser recording, and they can also remarkably improve the durability of the optical information recording medium comprising the composition.

The organic dyestuffs and the metallocene derivatives may be used respectively singly or in the form of a mixture of two or more thereof. If necessary, additive substances such as a binder can be suitably added. Of course, the metallocene compound to be used herein may have a substituent or substituents, so long as it does not impair the effect of the above-mentioned invention. Examples of the acceptable substituent include alkyl groups having 1–10 caron atoms, acyl groups having 2–10 carbon atoms, aryl groups having 6–10 carbon atoms, aryloyl groups having 7–10 carbon atoms, aldehyde groups having 1–10 carbon atoms, carboxyl groups having 1–10 carbon atoms, alkoxy groups having 1–10 carbon atoms, amino groups having 0–10 carbon atoms, a hydroxyl group, halogen atoms and alkenyl groups having 2–10 carbon atoms. Above all, the metallocene compounds substituted by the alkyl group, the acyl group or the benzoyl group are preferable from the viewpoints of solubility and sublimation resistance.

Next, the effective β-diketonato metal complex is any of compounds represented by the following formula (1)

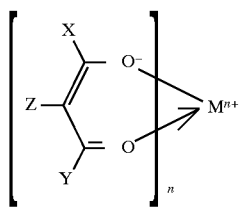

wherein each of the substituents X, Y and Z is independently a hydrogen atom, a halogen atom, $R^1$, $OR^2$, $SR^3$, $COOR^4$, $COONR^5R^6$, $SiR^7R^8R^9$ or $NR^{10}R^{11}$, and $M^{n+}$ is a metal having a valence of n (wherein $R^1$ is an unsubstituted or substituted alkyl group having 1–10 carbon atoms, such as methyl, ethyl, propyl and butyl, aryl group having 6–10 carbon atoms or unsaturated alkyl group having 2–10 carbon atoms; each of $R^2$, $R^3$, $R^4$, $R^5$, $R^6$, $R^7$, $R^8$, $R^9$, $R^{10}$ or $R^{11}$ is a hydrogen atom, an unsubstituted or substituted alkyl group having 1–10 carbon atoms, aryl group having 6–10 carbon atoms or unsaturated alkyl group having 2–10 carbon atoms).

In the above-mentioned formula, examples of M include transition metals in the periods IV, V and VI such as Fe, Co, Cr, Ni, Ti, V, Mn, Cu, Zn, Zr, Mo, Ru, Rh, Pd, Ag, Cd, In, Sn, W, Re, Os, Ir, Pt and Pb; transition metal oxides such as VO and MoO; and typical elements such as Mg, Ca, Ba and Al. As the β-diketonato metal complexes which can easily achieve the good film formation, is excellent in the deviation properties of the recorded pits, and can satisfy the low jitter properties from a particularly good pit shape, a serial of acetylacetonato compounds (each of X and Y=$CH_3$, and Z is H) are very preferable, and in particular, the acac complexes of Cr, Co, Fe, Ni, V, VO, MoO and Zr can show the extremely good functional effect. Above all, the complexes containing Cr, Co, V, Fe and Ni are the most preferable, because a general-purpose optical information recording medium such as CD-R comprising any of such complexes is very excellent in durability. Furthermore, if the improvement of the solubility and the film formation properties is intended, each substituent of X, Y and Z is preferably an unsubstituted or substituted alkyl group, aryl group, alkoxyl group or a halogen atom.

Next, with regard to the anti-knock agent which is specified as the dyestuff thermal decomposition accelerator, an octane value described in "Fuel Handbook" (Corona Publishing Co. Ltd., 1974, pp. 267–275) is applied as the measure of evaluation, and anti-knock properties can be evaluated by this octane value. In the present invention, a specific substance having an octane value of 80 or more can be defined as the anti-knock agent. Examples of the effective anti-knock agent include lead compounds such as tetraethyllead and tetramethyllead and cymantrene [$Mn(C_5H_5)(CO)_3$], and the employment of cymantrene or its derivative is particularly preferable, because when it is used, both workability and stability are good, so that a very effective dyestuff thermal decomposition acceleration effect can be confirmed and the formation of the good pits can be confirmed.

A mixing ratio of the organic dyestuff for the recording to the pit·edge control agent can be optimized by regulating the recording threshold level of the organic dyestuff, but the proper ratio is 0.1–1,000 parts by weight of the pit·edge control agent, preferably 5–200 parts by weight to 100 parts by weight of the dyestuff. If the amount of the pit·edge control agent is less than this range, the functional effect of the present invention cannot be sufficiently exerted, and conversely if it is more than the above-mentioned range, a recording sensitivity largely declines and the additives tend to cohere and crystallize unpractically.

Furthermore, the recording layer can usually be formed by dissolving the organic dyestuff and the pit·edge control agent in a solvent to prepare a coating solution, coating the transparent substrate with the coating solution, and then drying the same. In the formation process of the recording layer, coating methods such as a spin coating method, a dip coating method and a bar coat method can be used, but the spin coating method is preferable because of being capable of providing the precise and uniform layer.

In this case, it is preferable to select the solvent which can dissolve the organic dyestuff and/or the added pit·edge control agent but which does not damage the substrate. Examples of the utilizable solvent include aliphatic hydrocarbons such as n-heptane, n-octane, isooctane, cyclohexane, methylcyclohexane, ethylcyclohexane and 1,2-dimethylcyclohexane; aromatic hydrocarbons such as toluene and xylene; halogen-containing hydrocarbons such as carbon tetrachloride and chloroform; alcohols such as methanol, ethanol and isopropanol; ethers such as diethyl ether, dibutyl ether, isopropyl ether and dioxane; ethylene glycol ethers such as ethylene glycol methyl ether and ethylene glycol ethyl ether; ketones such as cyclohexanone and methyl ethyl ketone; esters such as ethyl acetate and butyl acetate; and a fluorine-containing alcohol such as 2,2,3,3-tetrafluoropropanol. Needless to say, these organic solvents may be used singly or in the form of a mixture of two or more thereof.

No particular restriction is put on the thickness of the organic dyestuff recording layer to which the pit·edge control agent has been added, but it is usually and properly in the range of from about 30 to about 1,000 nm, more preferably and suitably from about 50 to about 300 nm. If the thickness of the organic dyestuff recording layer is less than 30 nm, the release of heat to the metal reflective layer cannot be avoided and consequently, the sensitivity of the recording layer decreases. Conversely, if it is more than 1000 nm, the decreases of the reflectance cannot be avoided owing to the absorption of the recording layer. The thickness outside this region can be also used in some cases.

Between the above-mentioned transparent substrate and the recording layer comprising the organic dyestuff layer, an intermediate layer may be provided for the purposes of controlling the deformation of the recording pits toward the substrate side and obtaining adhesive strength therebetween. This intermediate layer can be formed of a thermosetting organic polymer, an Si polymer, a glass film or an inorganic film of $SiO_2$, $SnO_2$ or AlN.

Furthermore, on the above-mentioned recording layer, a metallic reflective layer is formed. The material for this reflective layer should have a sufficiently high reflectance in the wavelength region of the used laser beam, and examples of such a usable material include metals such as Au, Ag, Cu, Al, Cr and Ni. In addition, as the reflective layer, a multilayer interference reflective layer can be used which is formed by alternately laminating a substance film having a low refractive index and an optically refractive substance film. Above all, Au and Al are preferable, because they permit the easy formation of the reflective layer having the high light reflectance. The reflective layer usually has a thickness of from 30 to 200 nm, and it can be formed by a sputtering process, a vapor deposition process or an EB process.

Between this reflective layer and the recording layer, an intermediate layer may be provided for the purposes of further improving the reflectance and improving adhesive strength between the recording layer and the reflective layer. This intermediate layer can be formed of a polymeric material such as a polycarbonate, methyl polymethacrylate, polysilane or siloxane, or an inorganic film of $SiO_2$, $SnO_2$ or AlN.

On the reflective layer, a protective layer is further provided. No particular restriction is put on the protective layer, so long as it can protect the recording layer and the reflective layer. Examples of the usable material for the protective layer include polymeric materials such as a polycarbonate, an acrylate, a polystyrene, vinyl chloride, an epoxy and a polyester. Above all, an ultraviolet-curable acrylic resin is optimum because of being capable of easily forming the protective layer. The thickness of the protective layer is preferably in the range of from 1 to 30 $\mu$m.

On the above-mentioned protective layer, one or more printing layers may be further formed, the total thickness of the printing layers being in the range of from 0.2 to 50 $\mu$m. This printing layer can usually be formed by a technique of screen printing or offset printing, and in this case, concave and convex portions of about 3 $\mu$m depth or less may be formed on purpose.

The appearance structure of the optical information recording medium of the present invention is not such as to be particularly described, but it may suitably take a single plate structure or a laminate structure (having recording layers on both sides) in compliance with a purpose.

According to the function of the present invention which is not beyond mere supposition, radical intermediates and the like are inevitably produced in the light/heat conversion step in the organic dyestuff layer at the time of the recording and the organic dyestuff decomposition step which usually takes place after the conversion step, and various exciting species of the thus produced radical intermediates and the like give rise to a run-away reaction involving the violent generation of heat and in this step, the recording pits are formed. At this time, it can be presumed that the recording layer and a substrate interface or a metallic reflective layer interface are exposed to a higher temperature, so that the behavior of the pit formation in the recording layer leads to thermal deformation with the large volume change of the recording film and the adjacent substrate interface or the adjacent reflective layer interface. At this time, the large thermal deformation is considered to bring about the deterioration of the pit-edge control properties, i.e., the deterioration of the deviation properties (particularly, 3T) and the decline of the jitter properties. It can be presumed that the addition of the pit-edge agent, particularly, the addition of the dye thermal decomposition accelerator lowers the dye thermal decomposition starting temperature at the time of the recording, so that the thermal deformation of the recording layer and its surroundings can be decreased, whereby the characteristics of the recording layer can be improved. At this time, it is also important for temperature control in the system to inhibit the heat generation attributable to the dyestuff decomposition, and therefore the above-mentioned nitrocellulose system in which the generation of a large amount of heat cannot be avoided at the time of the decomposition is not preferable (however, if the content of the nitrocellulose is 5% or less, the nitrocellulose can be used together with the pit-edge agent which can be used in the present invention).

The reason why metallic compound, particularly, the organic metallic compound functions as the effective dyestuff thermal decomposition accelerator can be supposed to be that an electron transfer reaction caused by the metallic compound acts effectively on a step of the formation and the extinction of active intermediates (e.g., radicals, ions or a triplet exciting state) at the time of the dyestuff thermal decomposition by the oxidizing/reducing function of metallic atoms, metallic ions or a metallic compound itself contained in the compound, so that the thermal reaction is accelerated without involving any generation of a large amount of heat, and the decomposition properties of the organic dyestuff itself change. However, the detail of the above-mentioned principle is obscure.

Now, the present invention will be described in detail in reference to examples, but the scope of the present invention should not be limited to these examples.

EXAMPLE 1

In 100 ml of ethylcyclohexane were dissolved 2.0 g of a phthalocyanine dyestuff represented by the formula

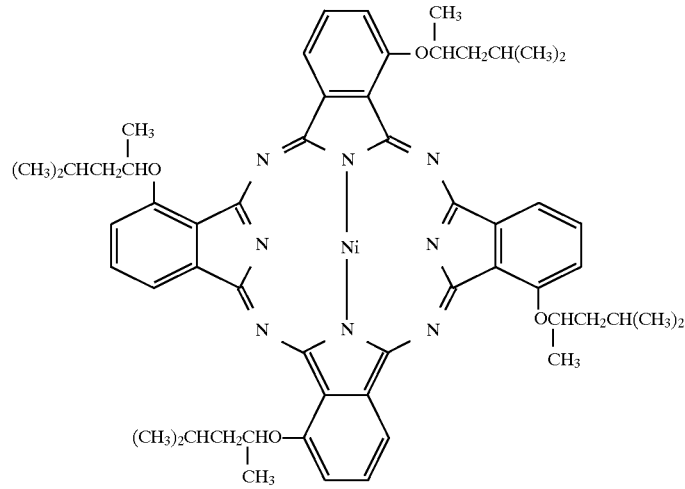

and synthesized in accordance with U.S. Pat. No. 5,124,067 as a recording dyestuff and 0.4 g of ferrocene (made by Tokyo Chemicals Co., Ltd.) to prepare a coating solution. Afterward, a polycarbonate substrate provided with a spiral groove (pitch =1.6 $\mu$m, groove width =0.6 $\mu$m and groove depth =0.18 m) and having an outer diameter of 120 mm and a thickness of 1.2 mm was coated with the prepared coating solution by spin coating at 1,000 rpm to form a recording layer. Next, on this recording layer, Au was deposited as thick as 80 nm by a sputtering process to form a reflective layer. Furthermore, on this reflective layer was spin-coated an ultraviolet-setting resin SD-17 (made by Dainippon Ink & Chemicals, Inc.), and the resin was then cured by UV irradiation to form a protective layer having a thickness of 6 μm.

The thus obtained CD-R medium was recorded (EFM recording) at a linear velocity of 1.2 m/sec at 6.0 mW by an optical disk evaluation device DDU-1000 (made by Pulstech Industry Co., Ltd., laser wavelength=781 nm and NA=0.50), and then played back by an optical head carried on a commercial CD player. At this time, jitter, BLER (block error rate) and the deviation of detection pits were measured by the use of a jitter meter (trade name LJM-1851, made by Leader Electronics Co., Ltd.), a CD-decoder (trade name DR 3552, made by KENWOOD Corp.) and a timing interval analyzer (trade name TIA-175, made by ADC Co., Ltd.), respectively.

Furthermore, a TG analysis was carried out as follows: Each sample mixed with a diethyl ether solution in the above-mentioned mixing ratio was air-dried, and 10 mg of the resultant uniformly mixed powder was then heated at a temperature rise rate of 10° C./min by means of a multipurpose thermal analyzer (trade name SSC 5200, made by Seiko Electronics Industry Co., Ltd.) to obtain a weight loss curve.

The results of the evaluation are set forth in Table 1. The values showing pit-edge controllability of 3T pit length and 3T land length were evaluated to be $s_p=38$ ns ($\Delta_p=+2$ ns, $\sigma_p=18$ ns) and $s_l=54$ ns ($\Delta_l=-8$ ns, $\sigma_l=23$ ns), respectively. These results indicate that the pit and the land were improved as much as 49 ns and 30 ns, respectively, as compared with a case where no ferrocene was added (see Comparative Example 1—1 given below). In this case, a measured dyestuff thermal decomposition starting temperature was 300° C., which meant that the temperature dropped about 50° C., as compared with the case where no ferrocene was added. The signal properties of the medium obtained by forming a film from the mixture were also very excellent, and BLER<5 was confirmed.

In addition, a playback state was checked and scored 5 times per sample by the use of a CD player (A) (trade name DP-8020, made by KENWOOD Corp.), a CD player (B) (trade name CDP-C900, made by Sony Corp.) and a CD player (C) (XL-Z 521, made by JVC Co., Ltd.) and a CD player (D) (A725), made by Studer Co., Ltd.) As a result, as shown in Table 1, the compatibility of these samples with the above-mentioned CD-players was very excellent.

COMPARATIVE EXAMPLE 1-1

The same procedure as in Example 1 was carried out except that any ferrocene was not added, to prepare a medium, and evaluation was then made in the same manner as in Example 1. The results of the evaluation are set forth in Table 1. The measured values of $s_p=87$ ns ($\Delta_p=+35$ ns, $\sigma_p=26$ ns) and $s_l=84$ ns ($\Delta_l=-12$ ns, $\sigma_l=36$ ns) were higher as compared with those of Example 1, and a measured dyestuff decomposition starting temperature was 350° C. BLER was as high as 200, which meant that it was worse as compared with that of Example 1. It was also confirmed by some CD players that playback was defective.

COMPARATIVE EXAMPLE 1-2

The same procedure as in Example 1 was carried out except that ferrocene was replaced with $CBr_4$, to prepare a medium, and evaluation was then made in the same manner as in Example 1. The results of the evaluation are set forth in Table 1. The values of $s_p=87$ ns ($\Delta_p=+35$ ns, $\sigma_p=26$ ns) and $s_l=81$ ns ($\Delta_l=-13$ ns, $\sigma_l=34$ ns) were evaluated, and a measured dyestuff decomposition starting temperature was 360° C. BLER was as high as 250, which meant that it was worse as compared with that of Example 1 and the improvement of characteristics was not observed at all. It was also confirmed by CD layers that defective playback often occurred.

EXAMPLE 2

In 100 ml of dibutyl ether were dissolved 2.0 g of a brominated phthalocyanine dyestuff having the structural formula:

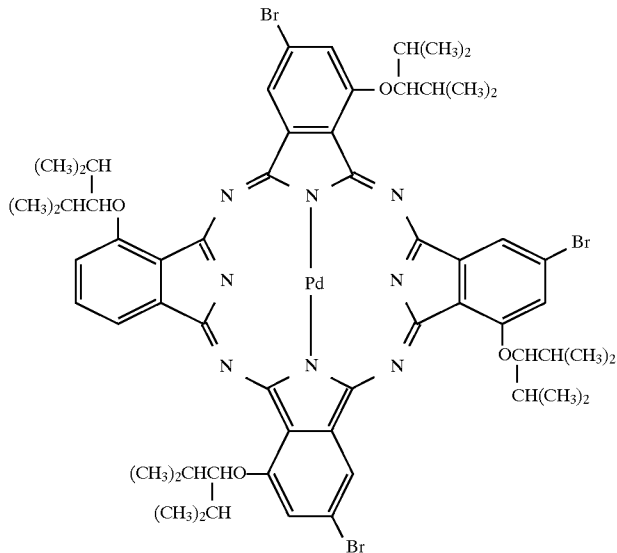

and synthesized in accordance with U.S. Pat. No. 5,124,067 as a recording dyestuff and 0.4 g of ferrocene to prepare a coating solution. Afterward, the same substrate as in Example 1 was spin-coated with the coating solution to form a film. Next, a TG analysis and the signal evaluation of the resultant CD-R medium were carried out in the same manner as in Example 1 (recording power=6.0 mW). The results of the evaluation are set forth in Table 1.

A decomposition starting temperature was 260° C., and the values of $s_p$=38 ns ($\Delta_p$=−2 ns, $\sigma_p$=18 ns) and $s_l$=50 ns ($\Delta_l$=−10 ns, $\sigma_l$=20 ns) were evaluated. BLER<5 which meant very excellent properties was obtained. Furthermore, on each type of the CD players, stable playback was confirmed.

COMPARATIVE EXAMPLE 2

The same procedure as in Example 2 was carried out except that any ferrocene was not added, to prepare a medium, and evaluation was then made in the same manner as in Example 1. The results of the evaluation are set forth in Table 1. The measured values of $s_p$=68 ns and $s_l$=74 ns meant much poorer characteristics as compared with those of Example 2, and it was also confirmed by some of the CD players that playback was defective.

EXAMPLE 3-1

In 100 ml of ethylcyclohexane were dissolved 2.0 g of a brominated phthalocyanine dyestuff having the structural formula:

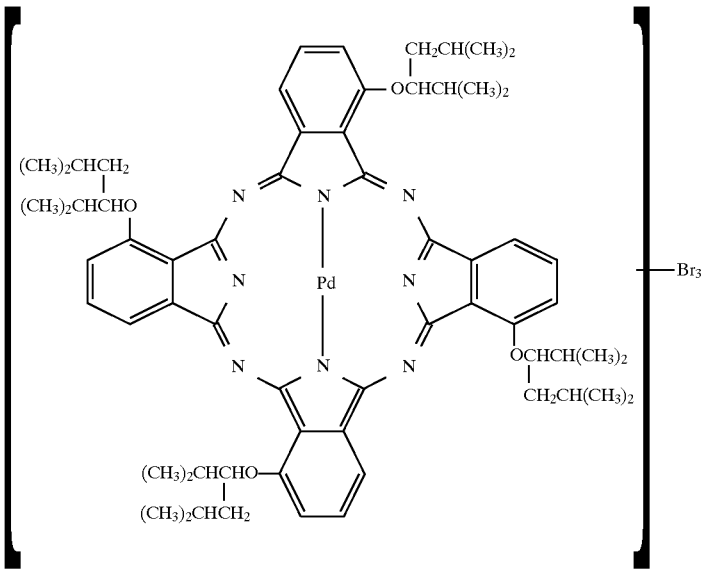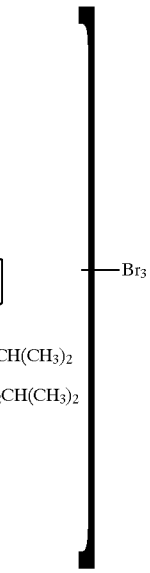

and synthesized in accordance with U.S. Pat. No. 5,124,067 as a recording dyestuff and 0.4 g of ferrocene to prepare a coating solution. Afterward, the same substrate as in Example 1 was spin-coated with the coating solution at 1,000 rpm to form a film. Next, a TG analysis and the signal evaluation of the resultant CD-R medium were carried out in the same manner as in Example 1 (recording power=5.5 mW). The results of the evaluation are set forth in Table 1.

In this case, a measured dyestuff thermal decomposition starting temperature was 255° C., which meant that the temperature dropped about 40° C., as compared with the case where no ferrocene was added. The signal properties of the medium obtained by forming a film from the mixture were $s_p$=45 ns, $s_l$=50 and BLER <5, which were indicative of good characteristics. In addition, the compatibility of the medium with each type of the CD-players was very excellent.

EXAMPLE 3-2

The same experiment as in Example 3-1 was carried out except that ferrocene was replaced with benzoylferrocene (made by Aldrich Co., Ltd.) and the same dyestuff as in Example 3-1 and benzoylferrocene were mixed in a weight ratio of 5:1 in accordance with the same prescription as in Example 3-1 to form a film. The results of the evaluation are set forth in Table 1.

Pit-edge controllability was evaluated to be $s_p$=49 ns ($\Delta_p$=−7 ns, $\sigma_p$=21 ns) and $s_l$=50 ns ($\Delta_l$=−10 ns, $\sigma_l$=−20 ns). A dyestuff thermal decomposition starting temperature was 235° C. (a drop of 60° C.) by which it was confirmed that the decomposition was remarkably accelerated, and the signal properties of the medium were also good, BLER<5. In addition, the compatibility of the medium with each type of the CD-players was very excellent.

EXAMPLE 3-3

The same experiment as in Example 3-1 was carried out except that ferrocene was replaced with 1,1'-dimethylferrocene (made by Tokyo Chemicals Co., Ltd.) and the same dyestuff as in Example 3-1 and 1,1'-dimethylferrocene were mixed in a weight ratio of 5:1 in accordance with the same prescription as in Example 3-1 to form a film. The results of the evaluation are set forth in Table 1.

A dyestuff thermal decomposition starting temperature was confirmed to be 240° C. (a drop of 55° C.), and signal properties of the resultant medium were $s_p$=38 ns, $s_l$=48 ns and BLER<5, which was indicative of good characteristics. In addition, the compatibility of the medium with each type of the CD-players was also very excellent.

EXAMPLE 3-4

The same experiment as in Example 3-1 was carried out except that ferrocene was replaced with n-butylferrocene (made by Tokyo Chemicals Co., Ltd.) and the same dyestuff as in Example 3-1 and n-butylferrocene were mixed in a weight ratio of 5:1 in accordance with the same prescription as in Example 3-1 to form a film. The results of the evaluation are set forth in Table 1.

A dyestuff thermal decomposition starting temperature was confirmed to be 250° C. (a drop of 45° C.), and pit-edge control properties were good and the signal properties of the resultant medium were very excellent, BLER<5. In addition, the compatibility of the medium with each type of the CD-players was also very excellent.

EXAMPLE 3-5

The same experiment as in Example 3-1 was carried out except that ferrocene was replaced with cyclohexenylferrocene (made by Tokyo Chemicals Co., Ltd.) and the same dyestuff as in Example 3-1 and cyclohexenylferrocene were mixed in a weight ratio of 5:1 in accordance with the same prescription as in Example 3-1 to form a film. The results of the evaluation are set forth in Table 1.

The drop of a dyestuff thermal decomposition starting temperature and good pit·edge control properties were confirmed, and the signal properties of the resultant medium were very excellent, BLER<5. In additions the compatibility of the medium with each type of the CD-players was also very excellent.

EXAMPLE 3-6

The same experiment as in Example 3-1 was carried out except that ferrocene was replaced with vinylferrocene (made by Tokyo Chemicals Co., Ltd.) and the same dyestuff as in Example 3-1 and vinylferrocene were mixed in a weight ratio of 5:1 in accordance with the same prescription as in Example 3-1 to form a film. The results of the evaluation are set forth in Table 1.

The drop of a dyestuff thermal decomposition starting temperature and good pit·edge control properties were confirmed, and the signal properties of the resultant media were very excellent, BLER<5. In addition, the compatibility of the medium with each type of the CD-players was also very excellent.

COMPARATIVE EXAMPLE 3-1

The same procedure as in Example 3-1 was carried out except that any ferrocene was not added, to prepare a medium, and evaluation was then made in the same manner as in Example 3-1. The results of the evaluation are set forth in Table 1.

A dyestuff thermal decomposition starting temperature was confirmed to be 295° C., and pit·edge controllability was evaluated to be $s_p$=76 ns ($\Delta_p$=+30 ns, $\sigma_p$=23 ns) and $s_l$=79 ns ($\Delta_l$=−15 ns, $\sigma_l$=32 ns), and BLER was not good, 50. It was also confirmed by one CD player that playback was defective.

COMPARATIVE EXAMPLE 3-2

The same experiment as in Example 3-1 was carried out except that ferrocene was replaced with transstilbene (made by Tokyo Chemicals Co., Ltd.) and the same dyestuff as in Example 3-1 and transstilbene were mixed in a weight ratio of 5:1 in accordance with the same prescription as in Example 3-1 to form a film. The results of the evaluation are set forth in Table 1.

A dyestuff thermal decomposition starting temperature was 305° C., and pit·edge controllability was also bad. In addition, it was also confirmed by all the CD players that playback was defective.

EXAMPLE 4-1

In 100 ml of a mixed solvent of ethylcyclohexane and isopropanol (in a volume ratio of 100:5) were dissolved 2.0 g of a brominated phthalocyanine dyestuff used in Example 3-1 as a recording dyestuff and 0.3 g of acetylacetonato iron complex [Fe(acac)$_3$, made by Tokyo Chemicals Co., Ltd.) to prepare a coating solution. Afterward, the same substrate as in Example 1 was spin-coated with the coating solution at 800 rpm to form a film. Next, a TG analysis and the signal evaluation of the resultant CD-R medium were carried out in the same manner as in Example 1 (recording power=5.0 mW). The results of the evaluation are set forth in Table 1.

A measured dyestuff thermal decomposition starting tempe rature was 250° C. (a drop of 45° C.). The pit·edge controllability of the medium obtained by forming the film from the above-mentioned mixture was evaluated to be $s_p$=57 ns ($\Delta_p$=+15 ns, $\sigma_p$=21 ns) and $s_l$=56 ns ($\Delta_l$=−10 ns, $\sigma_l$=23 ns) and BLER was 5, and these values were indicative of good characteristics. In addition, the compatibility of the media with each type of the CD-players was also excellent.

EXAMPLE 4-2

The same experiment as in Example 4-1 was carried out except that acetylacetonato iron complex was replaced with acetylacetonato chromium complex [Cr(acac)$_3$, made by Tokyo Chemicals Co., Ltd.)] and the same dyestuff as in Example 3-1 and acetylacetonato chromium complex were mixed in a weight ratio of 7.5:1 in accordance with the same prescription as in Example 4-1 to form a film. The results of the evaluation are set forth in Table 1.

The drop of a dyestuff thermal decomposition starting temperature and good pit·edge control properties were confirmed, and the signal properties of the resultant medium were also very excellent, BLER<5. In addition, the compatibility of the medium with each type of the CD-players was also very excellent.

EXAMPLE 4-3

The same experiment as in Example 4-1 was carried out except that acetylacetonato iron complex was replaced with acetylacetonato cobalt complex [Co(acac)$_3$, made by Tokyo Chemicals Co., Ltd.)] and the same dyestuff as in Example 3-1 and acetylacetonato cobalt complex were mixed in a weight ratio of 7.5:1 in accordance with the same prescription as in Example 4-1 to form a film. The results of the evaluation are set forth in Table 1.

The drop of a dyestuff thermal decomposition starting temperature and good pit·edge control properties were confirmed, and the signal properties of the resultant medium were also very excellent, BLER<5. In addition, the compatibility of the medium with each type of the CD-players was also very excellent.

EXAMPLE 4-4

The same experiment as in Example 4-1 was carried out except that acetylacetonato iron complex was replaced with acetylacetonato vanadium complex [V(acac)$_3$, made by Tokyo Chemicals Co., Ltd.)] and the same dyestuff as in Example 3-1 and acetylacetonato vanadium complex were mixed in a weight ratio of 7.5:1 in accordance with the same prescription as in Example 4-1 to form a film. The results of the evaluation are set forth in Table 1.

The drop of a dyestuff thermal decomposition starting temperature and good pit·edge control properties were confirmed, and the signal properties of the resultant medium were also very excellent, BLER<5. In addition, the compatibility of the medium with each type of the CD-players was also very excellent.

COMPARATIVE EXAMPLE 4

The same experiment as in Example 4-1 was carried out except that acetylacetonato iron complex was replaced with acetylacetone (made by Tokyo Chemicals Co., Ltd.) and the same dyestuff as in Example 3-1 and acetylacetone were mixed in a weight ratio of 7.5:1 in accordance with the same prescription as in Example 4-1 to form a film. The results of the evaluation are set forth in Table 1.

A dyestuff thermal decomposition starting temperature was 315° C., and pit-edge controllability was also bad.

EXAMPLE 5

In 100 ml of butyl ether were dissolved 2.0 g of a brominated phthalocyanine dyestuff used in Example 3-1 as a recording dyestuff and 0.2 g of cymantrene [$Mn(C_5H_5)(CO)_3$, made by Aldrich Co., Ltd.] to prepare a coating solution in a weight ratio of 10:1. Afterward, the same substrate as in Example 1 was spin-coated with the coating solution at 800 rpm to form a film. Next, a TG analysis and the signal evaluation of the resultant CD-R medium were carried out in the same manner as in Example 1 (recording power=5.0 mW). The results of the evaluation are set forth in Table 1.

The drop of a dyestuff thermal decomposition starting temperature and good pit-edge control properties were confirmed, and the signal properties of the resultant medium were also very excellent, BLER<5. In addition, the compatibility of the medium with each type of the CD-players was also very excellent.

EXAMPLE 6

The same experiment as in Example 5 was carried out except that cymantrene was replaced with naphthenic acid iron (made by Tokyo Chemicals Co., Ltd.) and the same dyestuff as in Example 3-1 and naphthenic acid iron were mixed in a weight ratio of 10:1 in accordance with the same prescription as in Example 5 to form a film. The results of the evaluation are set forth in Table 1.

The drop of a dyestuff thermal decomposition starting temperature and good pit-edge control properties were confirmed, and the signal properties of the resultant medium were also very excellent, BLER<5. In addition, the compatibility of the medium with each type of the CD-players was also very excellent.

TABLE 1

| | $T_{dis}$ (°C.) | $S_p$ (nm) | $S_l$ (nm) | BLER |
|---|---|---|---|---|
| Example 1 | 295 | 38 | 54 | <5 |
| Comp. Ex. 1-1 | 350 | 87 | 84 | 200 |
| Comp. Ex. 1-2 | 360 | 87 | 81 | 250 |
| Example 2 | 260 | 38 | 50 | <5 |
| Comp. Ex. 2 | 305 | 68 | 74 | 20 |
| Example 3-1 | 255 | 45 | 50 | <5 |
| Example 3-2 | 235 | 49 | 49 | <5 |
| Example 3-3 | 240 | 38 | 48 | <5 |
| Example 3-4 | 250 | 40 | 47 | <5 |
| Example 3-5 | 250 | 45 | 47 | <5 |
| Example 3-6 | 240 | 50 | 52 | <5 |
| Comp. Ex. 3-1 | 295 | 76 | 79 | 50 |
| Comp. Ex. 3-2 | 305 | 93 | 84 | 860 |
| Example 4-1 | 250 | 57 | 56 | 10 |
| Example 4-2 | 255 | 47 | 48 | <5 |
| Example 4-3 | 260 | 46 | 51 | <5 |
| Example 4-4 | 250 | 40 | 47 | <5 |
| Comp. Ex. 4 | 300 | 88 | 78 | 500 |
| Example 5 | 250 | 49 | 55 | <5 |
| Example 6 | 270 | 58 | 66 | 10 |

TABLE 1-continued

| | Playability | | | |
|---|---|---|---|---|
| | A | B | C | D |
| Example 1 | 5 | 5 | 5 | 5 |
| Comp. Ex. 1-1 | 0 | 5 | 1 | 0 |
| Comp. Ex. 1-2 | 0 | 5 | 0 | 0 |
| Example 2 | 5 | 5 | 5 | 5 |
| Comp. Ex. 2 | 5 | 5 | 5 | 0 |
| Example 3-1 | 5 | 5 | 5 | 5 |
| Example 3-2 | 5 | 5 | 5 | 5 |
| Example 3-3 | 5 | 5 | 5 | 5 |
| Example 3-4 | 5 | 5 | 5 | 5 |
| Example 3-5 | 5 | 5 | 5 | 5 |
| Example 3-6 | 5 | 5 | 5 | 5 |
| Comp. Ex. 3-1 | 5 | 5 | 5 | 0 |
| Comp. Ex. 3-2 | 0 | 0 | 0 | 0 |
| Example 4-1 | 5 | 5 | 5 | 5 |
| Example 4-2 | 5 | 5 | 5 | 5 |
| Example 4-3 | 5 | 5 | 5 | 5 |
| Example 4-4 | 5 | 5 | 5 | 5 |
| Comp. Ex. 4 | 0 | 1 | 0 | 0 |
| Example 5 | 5 | 5 | 5 | 5 |
| Example 6 | 5 | 5 | 5 | 5 |

In Table 1, the dyestuff thermal decomposition starting temperature ($T_{dis}$) obtained by the TG analysis and the evaluation results of the pit-edge controllability $s_p$ and $s_l$ of the 3T pits and lands as the signal evaluation results of the resultant CD-R media are described. Furthermore, in this table, there are shown the values of the block error rates (BLER) which are the indexes of the compatibility with the commercial CD players, and the evaluation results of the playability of the media on the above-mentioned several commercial CD players (A, B, C and D). The playability has been evaluated by scoring the confirmed number of the normal operations of the media in the case that a playback test has been carried out 5 times on each CD player.

As is apparent from Table 1, there is the tendency that the dyestuff thermal decomposition starting temperature can be dropped by adding the pit-edge control agent, i.e., the dyestuff thermal decomposition accelerator, and thus the index of the pit-edge controllability can be dropped, so that the signal properties of the CD-R media can be largely improved.

From Examples 1, 2, 3-1 to 3-6 and Comparative Examples 1-1, 1-2, 2, 3-1 and 3-2, the improvement of the pit-edge controllability by adding a metallocene and its derivative has been confirmed together with the remarkable drop of the thermal decomposition starting temperatures of the recording dyestuffs, and it is also shown that BLER of the CD-R media comprising the system is sufficiently low. In addition, the compatibility with each type of the commercial CD players has also been confirmed.

From Examples 4-1 to 4-4 and Comparative Example 4, the effect due to the addition of β-diketonato metal complex has been confirmed.

Furthermore, from Example 5, the effect of cymanthrene for remarkably showing anti-knock properties has been certified, and in Example 6, the good properties of the iron-containing metallic compound has been confirmed.

As described above, the deviation properties and the jitter properties can be remarkably improved by adding the pit-edge control agent, above all, the dyestuff thermal decomposition accelerator for the formed pits to the recording film comprising the recording dyestuff, whereby the CD-R media having a low error rate and good recording properties can be provided. In consequence, the stable compatibility with the commercial CD players can be secured.

What is claimed is:

1. A composition for a pit-forming optical information recording medium which comprises an organic dyestuff and an effective amount for pit edge control of a pit-edge control agent, wherein said pit-edge control agent is a thermal decomposition accelerator for the dyestuff, is a metallic compound, has substantially no absorption at the wavelength of a recording laser beam, and is soluble in a solvent for the organic dyestuff and wherein the amount of said pit-edge control agent is in the range of from 0.1 to 1,000 parts by weight based on 100 parts by weight of the organic dyestuff.

2. The composition for an optical information recording medium according to claim 1 wherein said metallic compound is a metallocene or its derivative.

3. The composition for an optical information recording medium according to claim 1 wherein said metallic compound is a β-diketonato metal complex represented by formula (1):

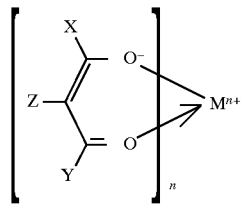

(1)

wherein each of the substituents X, Y and Z is independently a hydrogen atom, a halogen atom, $R^1$, $OR^2$, $SR^3$, $COOR^4$, $COONR^5R^6$, $SiR^7R^8R^9$ or $NR^{10}R^{11}$, and $M^{n+}$ is a metal having a valency of n (wherein $R^1$ is an unsubstituted or substituted alkyl group, aryl group or unsaturated alkyl group, and each of $R^2$, $R^3$, $R^4$, $R^5$, $R^6$, $R^7$, $R^8$, $R^9$, $R^{10}$ or $R^{11}$ is a hydrogen atom, an unsubstituted or substituted alkyl group, aryl group or unsaturated alkyl group).

4. The composition for an optical information recording medium according to claim 1 wherein said metallic compound is an anti-knocking agent.

5. The composition for an optical information recording medium according to claim 1 wherein said organic dyestuff is a phthalocyanine compound.

6. The composition for an optical information recording medium according to claim 5 wherein said phthalocyanine compound is a halogenated phthalocyanine.

7. A method for preparing an optical information recording medium which comprises the steps of:

dissolving the composition of claim 1 in a solvent to form a solution, and coating the thus obtained solution on a transparent substrate, thereby forming a recording layer comprising the organic dyestuff and the pit-edge control agent.

* * * * *